United States Patent Office 3,118,002
Patented Jan. 14, 1964

3,118,002
PROCESS OF PREPARING α,β-UNSATURATED THIOETHERS
Erhard P. Benzing, Adliswil, Zurich, Switzerland, assignor to Monsanto Chemical Company, St. Louis, Mo., a corporation of Delaware
No Drawing. Filed Jan. 18, 1961, Ser. No. 83,366
Claims priority, application Switzerland Jan. 22, 1960
12 Claims. (Cl. 260—609)

The present invention relates to a process of preparing α,β-unsaturated thioethers having the following general formula:

$$R=CH-S-R'$$

In this formula R is a bivalent and R' a monovalent aliphatic, araliphatic, cycloaliphatic, cycloaliphatic-aliphatic, heterocyclic or heterocyclic-aliphatic hydrocarbon radical, R' moreover is an aromatic hydrocarbon radical, whereby these radicals can also contain substituents and olefinic double bonds and/or can be interrupted by heteroatoms like oxygen, nitrogen or sulfur, or by heteroatom groups like —CONH—, —CONR—, —SO$_2$NH—, —SO$_2$NR—, —SO—, —SO$_2$— etc.

Until now, there have been reported from the literature several α,β-unsaturated thioethers. Vinylthioether has been obtained by addition of mercaptans to acetylene (W. Reppe and F. Nicolai, DRP 617 543, September 24, 1933) or by reaction of vinylbromide with sodium mercaptide (D. Ströholm, Ber. dtsch. chem. Ges. 33, 840 (1900); J. Lövenich, J. Losen and A. Dierichs, Ber. dtsch. chem. Ges. 60, 950 (1927)).

Another known method is based on the dehydrohalogenation of α- or β-chloro-thioethers (H. Böhme and H. Bentler, Ber. dtsch. chem. Ges. 89, 1464 (1956)). Furthermore, it has been reported that some α-acyl-oxy-thioethers undergo spontaneous elimination of acid, whereby α,β-unsaturated thioethers also are formed (L. Horner and P. Kaiser, Liebig's Ann. Chem. 626, 19 (1959)).

Now, a simple and generally applicable process has been found, which enables the manufacture of a great number of different kinds of α,β-unsaturated thioethers, using easily available starting-products. The invention is based on the discovery that aldehydes, containing at least one mobile hydrogen atom on the α-carbon atom, can be condensed with mercaptans by removing continuously the water formed in the reaction and carrying out the process, preferably using an acidic catalyst. The condensation occurs according to the following scheme:

$$R'''-CHO+HS-R'\rightarrow R'''=CH-S-R'+H_2O$$

In a generally preferred method to put into practice the present invention, a mixture of aldehyde and mercaptan in a molar proportion of 1:1 is heated, possibly with addition of a catalyst and a solvent forming an azeotrope with water, on a reflux cooler which is provided with a water separator, the reaction water is removed continuously in an azeotrope and the formed α-β-unsaturated thioether is separated by distillation or by other usual methods. The removing of the reaction water can also be accomplished by addition of water-binding compounds such as CaO, CaSO$_4$, silicic acid gel etc., in the water separator, or, depending on the circumstances, also in the reaction vessel, if indifferent drying means are employed. The removing of the water can also be effected conveniently in known manner by using an appropriate Linde molecular sieve.

A change of the molar ratio of 1:1 which is necessary for the formation of a semi-acetal, is rather disadvantageous, since the excess aldehyde on the one hand condenses itself and the mercaptals formed by the excess mercaptan on the other hand often cannot so easily be converted to the unsaturated thioethers like the half-mercaptans. Of course, the self-condensation of aldehydes, i.e. the elimination of water from simultaneously formed aldols is not possible with α-branched aldehydes, such as isobutyraldehyde, 2-ethylbutyraldehyde, α-methyl-phenyl-acetaldehyde etc. and for this reason, generally, the yields of unsaturated thioethers are better by using these aldehydes. In certain cases, as, for example, reacting tertiary butylmercaptan with iso-butyraldehyde, the reaction proceeds without a catalyst. In other cases, as, for example, reacting n-butylmercaptan with iso-butyraldehyde, a catalyst is necessary for obtaining good yields. The omission of such relatively inexpensive catalysts which are efficient in all cases, as a rule, gives no essential advantages. Suitable catalysts are the well-known acid compounds, such as, for example, p-toluene sulfonic acid, phosphoric acid, sulfuric acid, zinc-chloride, boric acid, hydrohalides, acid activated bleaching clays, etc.

The azeotrope, used to remove the water, will be formed either from the reacting aldehydes, mercaptans or from both of them, or, if necessary, a solvent like chloroform, benzene toluene, xylene, cyclohexane etc., which forms an azeotrope with water, must be added specially.

The boiling point of the reaction mixture is principally determined by the boiling point of the reactants or the solvent possibly being present, the azeotrope formed therefrom, respectively, so long as the condensation, i.e. the water formation, proceeds relatively slowly, which is generally the case, since the reaction mixture will be strongly refluxed to facilitate the separation of water.

If the reactants do not form an azeotrope with water and therefore a solvent forming an azeotrope with water is necessary, it will conveniently be selected, thus, the azeotrope which is formed with water and possibly with one or both of the reactants, has a boiling point being about equal or preferably below the boiling point of the reactants.

By using higher boiling aldehydes and mercaptans which give an azeotrope with water, it may be advantageous to reflux under reduced pressure.

Since many of the aldehydes and thiol compounds, suitable to be used here, form an azeotrope with water and also the choice of appropriate solvents comprising a large range of boiling points, all of the defined aldehydes and mercaptans, except those mentioned below, can be condensed according to the process of the invention, to give the α,β-unsaturated thioethers.

Acetaldehyde is not suitable for the reaction by reason of its low boiling point (20.8° C.), because the reaction temperature of the process of invention must be about 40° C. and preferably higher, unless the reaction is carried out under pressure. Apart from this, all aliphatic, cycloaliphatic, cycloaliphatic-aliphatic and araliphatic aldehydes can be employed, so far as they possess a boiling point of about 45° C. and on the α-carbon atom a mobile hydrogen atom. Herein, the expression "mobile hydrogen atom" signifies a hydrogen atom which is capable to be eliminated together with the hydroxyl on the neighboring carbon atom of the semi-mercaptal as reaction water or, depending on the circumstances, together with one of the thiol radicals of the mercaptal as mercaptan.

As a general rule preferred aldehydes have less than 20 carbon atoms. Illustrative examples of aldehydes which can be condensed according to the process of invention, are: propionaldehyde, n-butyraldehyde, iso-butyraldehyde, n-valeraldehyde, iso-valeraldehyde, methyl-ethyl-acetaldehyde, n-capronaldehyde, n-pelargonaldehyde, n-capraldehyde, undecanal, lauraldehyde, tridecanal, myristaldehyde, pentadecanal, palmitaldehyde, margaraldehyde, stearaldehyde, oleadehyde etc., crotonaldehyde, acrolein, tiglaldehyde, citronellal, citral, etc., phenylacetaldehyde, α-methyl-phenyl-acetaldehyde, diphenylacetaldehyde, phenylpropionaldehyde, p-methylhydratropaldehyde, phenylisobutyraldehyde etc., cinnamaldehyde, phenylcrotonaldehyde etc., tetrahydrobenzaldehyde, cyclopentylacetaldehyde, cyclooctylpropionaldehyde, cycloheptylbutyraldehyde etc., furylacetaldehyde, furfurylacetaldehyde, tetrahydrofurfural, etc.

These aldehydes can contain substituents such as, for example, halogen, hydroxyl, oxy, alkoxyl, alkylthio, carbonyl, carboxylate, nitrile, nitro, nitrato, sulfoxyl, sulfoxylate, acylamide, dialkylamino etc. or possible combinations thereof. Especially preferred are the halogenated aldehydes on account of their easy availability. Illustrative examples are chloroacetaldehyde,
bromoacetaldehyde,
fluoroacetaldehyde,
dichloroacetaldehyde,
α-chloropropionaldehyde,
β-bromopropionaldehyde,
α,β-dichloropropionaldehyde,
α-nitro-β-chloropropionaldehyde,
α-chloro-β-nitrato-propionaldehyde,
β-bromocinnamaldehyde,
α,β-difluoro-cinnamaldehyde,
α-chloro-β-nitrato-cinnamaldehyde,
β,γ-dichlorovinylacetaldehyde,
α-chloro-
n-butyraldehyde
phenyl-α-bromoacetaldehyde, etc.

As a general rule preferred thiol compounds have less than 20 carbon atoms. Among the thiol compounds that can be condensed with the enumerated aldehydes according to the process of invention practically all existing aliphatic, cycloaliphatic, cycloaliphatic-aliphatic, araliphatic, aromatic and heterocyclic mercaptans can be used which are stable at the relatively low reaction temperatures, if the boiling point of the reaction mixture is about 40° C. or higher. The low boiling methylmercaptan (B.P. 7.6° C.) is therefore not suitable unless the reaction is carried out under pressure and also ethylmercaptan (B.P. 34.7° C.) reacts extremely slowly under ordinary pressure according to the novel method herein disclosed. The propylmercaptans (B.P. 60° and 68° C.) and the higher homologues, on the contrary, are well suitable. An illustrative but non-limiting list of suitable mercaptan reactants are the following:

n-propylmercaptan,
iso-propylmercaptan,
allyl-mercaptan,
n-butylmercaptan,
iso-butylmercaptan,
sec-butylmercaptan,
t-butylmercaptan,
n-amylmercaptan,
iso-amylmercaptan,
t-amylmercaptan,
n-hexylmercaptan,
cyclohexylmercaptan,
n-octylmercaptan,
caprylmercaptan,
n-decylmercaptan,
laurylmercaptan,
myristylmercaptan,
cetylmercaptan,
palmitylmercaptan,
stearylmercaptan,
benzylmercaptan, etc.

Like the aldehydes to be reacted, also the thiol compounds can be unsaturated and/or bear substituents. Contrary to the aldehydes, thereby it is indifferent whether a hydrogen atom is still present on the α-carbon atom or not. The α-carbon atoms may also be a part of an aromatic ring system, as, for example, with thiophenol, thionaphthol, etc.

Further it was found that dialdehydes, such as, for example, malonaldehyde, succinaldehyde, pentandial, octandial, decandial etc. and dithiols, such as, for example, ethandithiol, 1,2-propandithiol, 1,3-propandithiol, butandithiols, hexandithiols, dithioresorcin, dithiohydroquinone, dithionaphthoquinone etc. can successfully be used for carrying out this invention.

By condensation of a dithiol with a dialdehyde one can prepare higher molecular compounds containing the olefinic grouping >C=CH—S—R' several times.

It is intelligible that besides the mentioned condensation, also side reactions may occur, depending on the reactivity of the employed aldehyde or on the substituents of these or of the mercaptans possibly present. Thus, for example, with dialdehydes one of the aldehyde groups may subsist a mercaptalization and also certain, especially α,β-unsaturated aldehydes, such as e.g. acrolein, crotonaldehyde or aldehydes having in the α-position activating groups like keto, carbonyl, cyano etc. may react, depending on the circumstances, with more than one molecule of mercaptan. Furthermore, aldols may be formed as the intermediates which in turn condense with mercaptans. Primary and secondary amino groups, being possibly present in the mercaptans, can condense in a similar way as the thiol group by formation of Schiff bases or enamines etc. The greater consumption of aldehyde, of course, must be compensated in such cases, or the reaction is to be conducted stepwise.

But in each case are obtained the defined α,β-unsaturated thioethers and therefore a very general process for the manufacture of such compounds is given. Although the accomplishment of a condensation between aldehydes and amines by removing the reaction water with basic water binding agents or in an azeotrope has been well-known for a long time, it is surprising that a varied method using no catalyst or if need be an acid catalyst, makes possible the condensation between the defined aldehydes and mercaptans.

Alternatively, to the use of mercaptans and aldehyde reactants in the process of the invention hemimercaptals can be used. In fact hemimercaptals are intermediate products formed in making the α,β-unsaturated thioethers from mercaptans and aldehydes. Hemimercaptals are made by the addition in 1:1 molar ratio or equivalent amounts of thiophenols to aldehydes without splitting out water preferably under acid catalysis at more moderate temperatures than necessary for the formation of the corresponding α,β-unsaturated thioethers. Thus hemimercaptals can be first formed by reacting any of the named aldehydes with any of the named mercaptans. Then the reaction temperature can be increased to cause water to split off and be removed continuously, e.g. as an azeotrope with an added azeotroping agent such as benzene, with the result that a thioether is formed, the same reaction temperatures being applicable as for the formation of the unsaturated thioethers directly from aldehyde and mercaptan. An illustrative but non-limiting list of hemimercaptal reactants suitable for use in the process of the invention are the following:

1-hydroxy-1-n-butylthio-iso-butane,
1-hydroxy-1-n-butylthio-2-ethylbutane,
1-hydroxy-1-t-butylthio-2-ethylbutane,
1-hydroxy-1-t-butylthio-iso-butane,
1-hydroxy-1-phenylthio-iso-butane,
1-hydroxy-1-phenylthio-n-butane,
1-hydroxy-1-iso-propylthio-2-ethylbutane, etc.

Preferred hemimercaptals for the process of the invention contain less than about 20 carbon atoms.

The α,β-unsaturated thioethers can be made in yet another new way by the reaction under acid catalysis of mercaptals with aldehydes in 1:1 molar ratio or equivalent amounts with continuous removal of water formed during the reaction. Temperatures of reaction are in the same range as used for the formation of the unsaturated ethers directly from aldehydes and mercaptans. Mercaptals are formed by the reaction of 2 moles of mercaptan with 1 mole of aldehyde assuming both the mercaptan and aldehyde are monofunctional using acid catalysis. The mercaptals can be formed by reacting any of the named aldehydes with any of the named mercaptans. An illustrative but non-limiting list of mercaptal reactants suitable for reaction with named aldehydes in the process of the invention are the following:

1,1-di-n-butylthio-2-ethylbutane,
1,1-di-t-butylthio-2-ethylbutane,
1,1-di-t-butylthio-iso-butane,
1,1-di-n-butylthio-iso-butane,
1,1-di-phenylthio-iso-butane,
1,1-di-phenylthio-n-butane,
1,1-di-isopropylthio-2-ethylbutane, etc.

Preferred mercaptals for the process of the invention contain less than 20 carbon atoms.

The $\alpha,\beta$-unsaturated thioethers are valuable intermediates. The olefinic double bond present still shows partly the usual reactivity of olefins. The unsaturated thioethers obtained by using halogenated aldehydes and/or mercaptans can be dehydrohalogenated by usual ways, thereby multi-unsaturated thioethers result. By oxidation can be obtained the corresponding sulfones and sulfoxides. The sulfoxides are made by oxidizing the thioethers using hydrogen peroxide as the oxidizing and ethyl acetate/glacial acetic acid solvent, preferably at temperatures below about 0° C.; whereas, the sulfones are obtained by oxidation at higher temperatures and possibly for longer periods of time. Certain $\alpha,\beta$-unsaturated thioethers are able to display the properties of biocides particularly if they are attached to phosphorus compounds. These thioethers are also useful as oil additives.

EXAMPLE 1

1-n-Butylthio-2-Ethylbutene-1

To 35.2 g. of n-butylmercaptan (0.390 mole) are added with stirring 60 ml. of 2-ethylbutyraldehyde (0.390 mole +volume of separator) and a small amount of p-toluene sulfonic acid. The reaction mixture is refluxed during 5 hours using a water separator, thereby 6.8 ml. of water separate. By the subsequent distillation are obtained:

56.5 g. 1-n-butylthio-2-ethylbutene-1=84.4%; B.P. 97–98° C./14 mm.; colorless oil; $n_D^{20}$ 1.4800.

EXAMPLE 2

1-t-Butylthio-2-Ethylbutene-1

To 6.31 g. of t-butylmercaptan (0.07 mole) are added 17.5 ml. of 2-ethylbutyraldehyde (0.07 mole+volume of separator) and a small amount of p-toluenesulfonic acid. The reaction mixture is refluxed during 2 hours using a water separator, thereby 1.35 ml. of water separate. By the subsequent distillation are obtained:

6.6 g. of 1-t-butylthio-2-ethylbutene-1=55%; B.P. 77–78° C./13 mm.; colorless oil; $n_D^{20}$ 1.4727.

EXAMPLE 3

1-t-Butylthio-Iso-Butene-1

To 45.1 g. of t-butylmercaptan (0.5 mole) are added 76 ml. of iso-butyraldehyde (0.5 mole+volume of separator) with stirring and possibly cooling. The reaction mixture is refluxed during 17 hours, using a water separator. Thereby 75 ml. of water separate. By distillation in vacuo through a column are obtained:

49.1 g. of 1-t-butylthio-iso-butene-1=70.5%; B.P. 52° C./13 mm.; colorless oil; $n_D^{20}$ 1.4729.

EXAMPLE 4

1-n-Butylthio-Iso-Butene-1 and 1,1-Di-n-Butylthio-Iso-Butane

To 45.1 g. of n-butylmercaptan (0.5 mole) are added 81 ml. of iso-butyraldehyde (0.5 mole+volume of separator) and a small amount of p-toluene sulfonic acid and the reaction mixture is refluxed using a water separator. After 21 hours 7.0 ml. of water separate. By distillation of the reaction mixture in vacuo through a column are obtained:

19.9 g. of 1 - n - butylthio - iso - butene-1=25.5%; B.P. 79–80° C./20 mm.; colorless oil; $n_D^{20}$ 1.4789.

31.0 g. of 1,1-di-n-butylthio-iso-butane=52.8%; B.P. 106–109° C./0.35 mm.; colorless oil; $n_D^{20}$ 1.4873.

EXAMPLE 5

1-Phenylthio-Iso-Butene-1

To 46.3 g. of thiophenol (0.42 mole) are added 63.5 ml. of iso-butyraldehyde (0.42 mole+volume of separator) with stirring; thereby the temperature raises and the solution becomes turbid. One refluxes during 3½ hours using a separator, thereby 5.5 ml. of water separate. By the subsequent distillation are obtained:

40.8 g. of 1 - phenylthio - iso - butene-1=59.4%; B.P. 61–64°/0.06–0.75 mm.; colorless oil; $n_D^{20}$ 1.5792.

As by-product are obtained 5.5 g. (=9.6%) of the corresponding mercaptal; $n_D^{20}$ 1.6139.

EXAMPLE 6

1-Phenylthio-n-Butene-1

To 55.1 g. of thiophenol (0.5 mole) are added 45.4 ml. of n-butyraldehyde (0.5 mole+volume of separator) with stirring. Thereby the solution becomes warm and turbid. One refluxes using a separator, thereby during 7½ hours 8 ml. of water separate. The solution colors black-brown. By the subsequent distillation are obtained:

29.7 g. of 1-phenylthio-n-butene-1=36.2%; B.P. 62°/0.22 mm.; colorless oil; $n_D^{20}$ 1.5700.

As by-product are obtained 12.1 g. (=17.6%) of the corresponding mercaptal a yellow oil with B.P. 98–102° C./0.05 mm.; $n_D^{20}$ 1.5867.

EXAMPLE 7

1-Iso-Propylthio-2-Ethylbutene-1

An apparatus is used in which the reflux, dropping off the condenser, has to pass through a syphon filled with 20 g. of Linde Molecular Sieves before it can flow back into the reaction flask.

25 g. of iso-propylmercaptan (0.33 mole) and 32.8 g. of 2-ethylbutyraldehyde (0.33 mole plus 50 ml. corresponding to the volume of the syphon) are refluxed. The reflux remains clear but the "Molecular Sieves" becomes warm. After 1 hour, a small amount of p-toluene sulfonic acid is added. Immediately the reflux becomes turbid and 2.6 ml. of water separate in 15 minutes, after this the water separation ceases. The mixture is distilled in vacuo. After a forerun of unused aldehyde, 39.0 g. (=75.2%) of 1-iso-propylthio-2-ethylbutene-1 are collected; B.P. 78–80° C./11 mm.; $n_D^{20}$ 1.4790.

Analysis.—$C_9H_{18}S$ (158.3):

|  | Calc. | Found |
| --- | --- | --- |
| Percent C | 68.28 | 67.74 |
| Percent H | 11.46 | 10.82 |
| Percent S | 20.26 | 19.65 |

EXAMPLE 8

1,3-Bis-(n-Butylthio)-n-Butene-1

45.1 ml. of n-butylmercaptan (0.5 mole) and 36.4 ml. of crotonaldehyde (0.5 mole+volume of separator) are refluxed 2 hours using a water separator, thereby 1 ml.

of water separates. A small amount of p-toluene sulfonic acid is then added. During the next hour are separated 4 ml. of water. The reaction mixture turns deep brown. Distillation in vacuo through a column yields among a large amount of undistillable brown oil 14.5 g. (=25%) of a yellow oil; B.P. 87–88° C./0.04 mm.; $n_D^{20}$ 1.5087.

*Analysis.*—$C_{12}H_{24}S_2$:

|  | Calc. | Found |
| --- | --- | --- |
| Percent C | 62.04 | 62.11 |
| Percent H | 10.41 | 10.35 |
| Percent S | 27.55 | 27.52 |

From the two possible structures

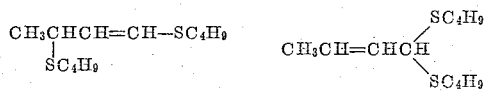

the first one is preferred on the basis of analogy with amines and the UV-spectrum.

EXAMPLE 9

*1-n-Butylthio-Isobutene-1*

20 g. of 1,1-di-n-butylthio-iso-butane (0.085 mole) and 32.5 ml. of iso-butyraldehyde (0.085) mole+dead volume of water-separator) are refluxed using a Dean Stark water-separator. During 1 hour no water separates. After the addition of a small amount of p-toluene sulfonic acid the mixture turns brown and 1.1 ml. of water separates during 2 hours. Distillation yields 19.1 g. (=72%) 1-n-butylthio-iso-butene-1; B.P. 75–76.5° C./16 mm.; identified by comparison with an authentic sample.

EXAMPLE 10

*1-n-Butylthio-Iso-Butene-1*

To 81 g. of 1-hydroxy-1-n-butylthio-iso-butane (0.5 mole) are added at sufficient benzene to fill the water separator and a small amount of p-toluene sulfonic acid. Stirring is provided and the reaction mixture is refluxed for 17 hours, using a water separator and cooling, if necessary. Thereby about 7.5 ml. of water separate. By distillation in vacuo through a column are obtained: About 49 g. of 1-n-butylthio-iso-butene-1; B.P. 79–80° C./20 mm.; colorless oil; $n_D^{20}$ 1.4789.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. For example, the term "hydrocarbon" has been used in its broader sense, in that reactants as described above can also contain constituents other than carbon and hydrogen which are non-reactive or at least which do not interfere with the desired α,β-unsaturated ether-forming reaction at the conditions used; i.e., the hydrocarbon groups can contain olefinic double bonds and substituents such as halogens, hydroxyl, oxy, mercapto, alkoxy, alkoxyl, alkylthio, formyl, carbonyl, carbonylate, nitrile, nitro, nitrato, sulfoxyl, sulfoxylate, acylamide, dialkylamino, etc., or combinations of these groups; and/or the hydrocarbon groups can be interrupted by heteroatoms like oxygen, nitrogen or sulfur, or by heteroatom groups like —CONH—, —CONR—, —SO₂NH—, —SO₂NR—, —SO—, —SO₂—, etc. Accordingly, modifications are contemplated which can be made without departing from the spirit of the described invention.

What is claimed is:

1. A process of preparing α,β-unsaturated thioethers of the formula R=CHS—R' wherein R is a bivalent hydrocarbon radical having both bonds connected to the same carbon atom on the radical and having not more than 20 carbon atoms and R' is a hydrocarbon radical having not more than 20 carbon atoms comprising reacting at a temperature of at least 40° C., reactants selected from the class consisting of (1) hemimercaptals of the formula $$R''\underset{\underset{OH}{|}}{C}HSR'$$

wherein R' is as defined hereinabove and R" is a monovalent hydrocarbon radical having at least one mobile hydrogen atom on the 1-carbon atom and having not more than 20 carbon atoms, (2) a mercaptan of the formula R'SH wherein R' is as defined hereinabove with substantially an equimolar amount of an aldehyde of the formula R"CHO wherein R" is as defined hereinabove, and (3) in the presence of an acid catalyst an aldehyde as defined hereinabove with substantially an equimolar amount of a mercaptal of the formula R"CH(SR')₂ wherein R' and R" are as defined hereinabove, and continuously removing the reaction water.

2. A process of claim 1 wherein said mercaptan is present in the second reactants in an amount necessary for the half-mercaptalization of said aldehyde, and said aldehyde is present in the third reactants in an amount necessary for the half-demercaptalization of said mercaptal.

3. A process of claim 1 wherein the reaction water is removed continuously in an azeotrope and said reactants have boiling points in excess of about 40° C. at the pressure used.

4. A process of claim 1 wherein an acid catalyst is present with all reactants.

5. A process of claim 4 wherein said acid catalyst is p-toluene sulfonic acid.

6. A process of preparing α,β-unsaturated thioethers of the formula R=CHS—R' wherein R is a bivalent hydrocarbon radical having both bonds connected to the same carbon atom on the radical and having not more than 20 carbon atoms and R' is a hydrocarbon radical having not more than 20 carbon atoms comprising reacting at a temperature of at least 40° C. in the presence of an acid catalyst substantially equimolar amounts of a mercaptan of the formula R'SH wherein R' is as defined hereinabove with an aldehyde of the formula R"CHO wherein R" is a monovalent hydrocarbon radical having at least one mobile hydrogen atom on the 1-carbon atom and having not more than 20 carbon atoms, and continuously removing the reaction water in an azeotrope.

7. A process of claim 6 wherein said acid catalyst is p-toluene sulfonic acid and said aldehyde and mercaptan have boiling points above 40° C. at the pressure used.

8. A process of preparing 1-n-butylthio-2-ethylbutene-1 comprising refluxing in the presence of a catalytic amount of p-toluene sulfonic acid a mixture of substantially equimolar amounts of n-butyl-mercaptan and 2-ethylbutyraldehyde, and continuously removing the reaction water in an azeotrope.

9. A process of preparing 1-t-butylthio-iso-butene-1 comprising refluxing a mixture of substantially equimolar amounts of t-butyl-mercaptan and iso-butyraldehyde, and continuously removing the reaction water in an azeotrope.

10. A process of preparing 1-phenylthio-isobutene-1 comprising refluxing in the presence of a catalytic amount of p-toluene sulfonic acid a mixture of substantially equimolar amounts of thiophenol and iso-butyraldehyde, and continuously removing the reaction water in an azeotrope.

11. A process of preparing 1-n-butylthio-isobutene-1 comprising refluxing in the presence of a catalytic amount of p-toluene sulfonic acid a mixture of substantially equimolar amounts of 1,1-di-n-butylthio-iso-butane and iso-butyraldehyde, and continuously removing the reaction water in an azeotrope.

12. A process of preparing 1-n-butylthio-iso-butene-1 comprising refluxing in the presence of a sufficient amount benzene to azeotrope out reaction water and a catalytic amount of p-toluene sulfonic acid, 1-hydroxy-1-n-butyl-thio-iso-butane, and continuously removing the reaction water in an azeotrope.

References Cited in the file of this patent

UNITED STATES PATENTS

| | | |
|---|---|---|
| 2,402,878 | Doumani | June 25, 1946 |
| 2,806,884 | Tapp et al. | Sept. 17, 1957 |
| 2,912,468 | Copenhaver | Nov. 10, 1959 |

FOREIGN PATENTS

| | | |
|---|---|---|
| 869,064 | Germany | Mar. 2, 1953 |
| 1,089,749 | Germany | Sept. 29, 1960 |

OTHER REFERENCES

Reid: Chemistry of Bivalent Sulfur, vol. II, pages 323 and 330 (1960).